(12) United States Patent
Ng (10) Patent No.: US 11,373,204 B2
(45) Date of Patent: Jun. 28, 2022

(54) USER INTERFACE TOOL FOR APPLYING UNIVERSAL ACTION TAGS

(71) Applicant: META PLATFORMS, INC., Menlo Park, CA (US)

(72) Inventor: Ter Chrng Ng, Seattle, WA (US)

(73) Assignee: META PLATFORMS, INC., Menlo Park, CA (US)

( * ) Notice: Subject to any disclaimer, the term of this patent is extended or adjusted under 35 U.S.C. 154(b) by 1111 days.

(21) Appl. No.: 14/644,341

(22) Filed: Mar. 11, 2015

(65) Prior Publication Data

US 2016/0267524 A1   Sep. 15, 2016

(51) Int. Cl.
*G06Q 30/02* (2012.01)
*G06Q 30/06* (2012.01)
*H04L 67/50* (2022.01)

(52) U.S. Cl.
CPC ..... *G06Q 30/0244* (2013.01); *G06Q 30/0201* (2013.01); *G06Q 30/0255* (2013.01); *G06Q 30/0641* (2013.01); *H04L 67/22* (2013.01)

(58) Field of Classification Search
CPC .......... G06Q 30/0244; G06Q 30/0201; G06Q 30/0255; G06Q 30/0641; H04L 67/22
See application file for complete search history.

(56) References Cited

U.S. PATENT DOCUMENTS

| | | | | |
|---|---|---|---|---|
| 7,890,581 B2* | 2/2011 | Rao | ........................ | G06Q 30/08 709/204 |
| 8,341,029 B1* | 12/2012 | Ramalingam | ...... | G06Q 30/0267 705/26.1 |
| 9,003,488 B2* | 4/2015 | Spencer | .............. | H04L 61/6022 713/168 |
| 9,009,190 B2* | 4/2015 | Barclay | .................. | G06Q 30/02 707/999.102 |
| 9,087,358 B1* | 7/2015 | Giorgalli | ............ | G06Q 30/0641 |
| 9,537,964 B2* | 1/2017 | Glommen | ............. | H04L 67/146 |
| 9,710,824 B1* | 7/2017 | Battles | ............... | G06Q 30/0255 |
| 10,117,075 B1* | 10/2018 | Nordstrom | .............. | H04W 4/12 |
| 2005/0177401 A1* | 8/2005 | Koeppel | ............ | G06Q 30/0201 705/4 |
| 2009/0076887 A1* | 3/2009 | Spivack | ............. | G06Q 30/0273 705/14.69 |
| 2009/0282002 A1* | 11/2009 | Reeder | ................... | G06Q 30/02 715/764 |

(Continued)

OTHER PUBLICATIONS

Gu, D2Taint: Differentiated and Dynamica Information Flow Tracking on Smartphones for Numerous Data Sources, Apr. 1, 2013, IEEE, pp. 791-799.*

(Continued)

*Primary Examiner* — Arthur Duran (57) ABSTRACT

Universal tags are placed on various web pages of a website. Unlike prior art action tags that indicate that an action has occurred, the universal tag sends a broader range of data capturing a user's experience on the website (e.g., whether an item was placed in a shopping cart, etc.) to a server. The server obtains an identity of the user from its own cookie on the user's device and stores the information received with the universal tag in connection with the user's account. A graphical user interface is used to define the information to be sent upon activation of the universal tag.

20 Claims, 3 Drawing Sheets

(56) References Cited

U.S. PATENT DOCUMENTS

| | | | | |
|---|---|---|---|---|
| 2009/0319357 | A1* | 12/2009 | Flake | G06Q 30/0224 705/26.1 |
| 2010/0115430 | A1* | 5/2010 | Skirpa | G06F 3/0481 715/760 |
| 2010/0138452 | A1* | 6/2010 | Henkin | G06Q 30/02 707/803 |
| 2010/0205541 | A1* | 8/2010 | Rapaport | G06Q 30/02 715/753 |
| 2010/0223279 | A1* | 9/2010 | Scott | G06Q 30/02 707/769 |
| 2010/0241507 | A1* | 9/2010 | Quinn | G06Q 30/0256 705/14.42 |
| 2010/0250397 | A1* | 9/2010 | Ippolito | G06Q 30/0601 705/26.1 |
| 2011/0153454 | A1* | 6/2011 | Dunn | G09F 3/0297 235/487 |
| 2011/0213655 | A1* | 9/2011 | Henkin | G06Q 30/00 707/E17.061 |
| 2011/0282821 | A1* | 11/2011 | Levy | G06Q 30/0631 706/47 |
| 2012/0084160 | A1* | 4/2012 | Badros | G06Q 30/0277 705/14.73 |
| 2012/0084810 | A1* | 4/2012 | Thompson | H04N 21/4728 725/34 |
| 2012/0209751 | A1* | 8/2012 | Chen | G06Q 30/06 705/27.2 |
| 2013/0226711 | A1* | 8/2013 | Wu | G06Q 30/02 705/14.69 |
| 2014/0059219 | A1 | 2/2014 | Seolas et al. | |
| 2014/0095320 | A1* | 4/2014 | Sivaramakrishnan | G06Q 30/0241 705/14.66 |
| 2014/0195387 | A1* | 7/2014 | Gopinath | G06Q 30/0631 705/27.1 |
| 2014/0282036 | A1* | 9/2014 | Shottan | G06F 40/14 715/738 |
| 2015/0073921 | A1* | 3/2015 | Vasudevan | H04H 60/375 705/14.72 |
| 2015/0088651 | A1* | 3/2015 | Geiger | G06Q 30/02 705/14.54 |
| 2016/0086248 | A1* | 3/2016 | Ohara | G06Q 30/0603 705/26.64 |
| 2016/0180439 | A1* | 6/2016 | Sherman | G06Q 30/0629 705/26.7 |
| 2018/0158489 | A1* | 6/2018 | Avedissian | G06Q 30/0278 |

OTHER PUBLICATIONS

Kruger, System for a model based analysis of user interaction patterns within web-applications, Oct. 1, 2011, IEEE, pp. 1274-1279.*

* cited by examiner

USER INTERFACE TOOL FOR APPLYING UNIVERSAL ACTION TAGS

BACKGROUND

This invention relates generally to tracking user behaviors and interactions with websites, mobile applications, and other electronic presentation systems. Specifically, this invention relates to a user interface tool for applying universal action tags.

User interaction with a webpage is commonly tracked using a combination of a tracking pixel (or "tag") and a cookie. The tag corresponds to code associated with a webpage that defines which user actions will generate reporting data sent to a server. Examples of reporting data that are defined in the tag include a product name or type, a price, a webpage identity, and a device identity. The cookie is a file or object placed on a user device that, upon the tag sending data to the advertising server, indicates an identity of a user device.

This conventional method has a number of limitations. For example, tags generally send data reporting whether specific user actions have occurred upon the rendering of a webpage. For example, a tag would report the identity of a user and of a product placed into a shopping cart. This is accomplished by code placed on the webpage that instructs these data to be sent. However, if the product changes or if additional or different information is requested, the code on the webpage must itself be revised. This limits the flexibility and convenience of tags.

SUMMARY

Embodiments of the present disclosure describe universal tags for use with webpages where activation (also referred to as "firing") of the tag sends a broad range of data to a server compared to data reported by conventional tags, in which the firing of the tag commonly only indicates that a specific event defined by the tag occurred. Because the universal tag reports a broad range of user behaviors, including various actions characteristic of a user experience, server-side rules are conveniently defined on a server for selectively identifying tracked behaviors and determining when an event occurred and what information to extract from this user experience data without any revisions to the tag itself. This improves the utility and convenience of tags. Also, the data filtered from the broad types of data sent by the universal tag are used to target additional information (e.g., retargeting for ads) to the user even as the targeting data of interest changes over time.

In other embodiments of the present disclosure, a user interface is provided for conveniently defining what data is sent by universal tags. Unlike prior tags that require an administrator to manually change the tag code itself in order to change which data are sent, the user interface allows for easy selection of different portions or elements of a webpage. These different portions are selected based on their interest and/or importance to, for example, a marketing team and about which the marketing team would like to collect data. The selection of these portions via the user interface controls what data are sent upon activation of the tag, by, for example, generating tag-side rules defining the information sent upon execution of one or more user actions on the page. These portions of the web page are selected and changed through a graphical user interface that does not require the individual making the selection to make any coding changes to the tag itself. This improves the convenience and usefulness of universal tags compared to conventional tags because the tag itself is unchanged regardless of which elements of page are selected (or unselected or otherwise changed) so as to report data upon user action. Furthermore, the user interface improves the convenience of tags because it is easy for a marketing team with less technical expertise to select important portions of a page and define tag-side rules associated with those portions to specify what information to pass to the server for the tag.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview and Universal Tags

Embodiments of the present disclosure enable a more detailed understanding of online behavior of a user. In some embodiments, a single universal tag can be placed on a single webpage, or on each webpage of a website for which data about user actions on a page is desired. Rather than merely indicating that a user has visited a particular webpage or performed a particular action on the page as defined by the conventional tag, universal tags send a broad range of data to a server that captures various aspects of a user's experience on a webpage (also referred to simply as a "page"). These data are then filtered or processed using server-side rules defining different events associated with a user that are of interest to an advertiser or other party using the tags.

Embodiments described herein improve the convenience of using tags. Conventional tags require manual changes to code associated with a specific tag on a specific webpage to change the content of reported data or to indicate what event is counted when the tag fires. As described below, because universal tags of the present disclosure can report a broad range of data characterizing the user experience and the rules that define what is counted as an event are set at the server-side, the tags remain relevant and current despite changes in analytical interests. Thus, there is no need to change the code on the individual webpages themselves. Rather, server-side rules are used to analyze the transmitted data and determine what events to count. These server-side rules can be defined, updated, and/or changed through a graphical user interface on the server-side that automatically updates the rules.

As indicated above, embodiments also include a graphical user interface used to identify which elements of a page, and which user interactions with those elements, trigger activation of a tag (i.e., the collection and transmission of user experience information by e.g., a URL redirect) on a webpage. This graphical user interface allows a marketing professional, for example, to select portions of a web page, such as a price, an item description, and a shopping cart icon on a product page. The selection of these portions via the user interface is performed in some embodiments by applying highlighting, such as with a box, on one or more elements of the web page of interest. In some embodiments, the highlighting box is simply moved around a page to highlight different parts of the page (e.g., price, item description, certain icons, etc.) to execute one or more selections. The portions selected via this user interface indicate for which elements user data is collected during the user's experience of the page. Then, if the page is rendered or reloaded, thus activating the tag, the user actions associated with the selected portions, such as interactions with the price, item description, and number of items in the shopping cart on the page, are provided to the server. The server-side rules are then applied to the received data to filter for a viewer (i.e., a marketing professional) the data of interest from all of the data transmitted.

The server-side rules are, for example, definable as a series or sequence of user actions with might, for example, specify tracking that an event occurred when there are at least two items in the shopping cart and the item description indicates an iPHONE® in white and the price is above a certain amount, or the rules might specify to record the number of items in the shopping cart any time the tag passes the item description and price for that page. Other examples include, but are not limited to, tracking search terms entered into a search box by a user on a website, tracking whether a user browsed to one or more product detail pages and actions taken on the detail pages (e.g., downloading a product specifications document), and whether a user engaged with interactive content (e.g., watched a product video) on a page.

This enables convenient, easy, and quick changes to analysis of the universal tags without requiring intervention of a skilled coder. A benefit of this easy manipulation is that the universal tags are updated promptly in response to changes in business need. Universal tags also allow for more complicated tracking of a user experience on a website since numerous fairly complex sets of rules can be defined to determine what events are tracked.

The universal tag can report information about different portions of the page with which the user interacted and can also report information about certain user interactions. Examples of user interactions reported by a single universal tag on a page include hovering over one or more webpage elements to engage a pop-up window, clicking on one or more webpage elements within a page, navigating to a new webpage, or otherwise selecting one or more element within a webpage. Examples of specific elements of a webpage for which a user action is reported include, but are not limited to, a price, a comment section, a product name, and an option or feature associated with a product (e.g., size, color, style, optional feature, memory quantity).

A universal tag defines data to be sent that characterizes the user experience so that even very specific server-side rules are able to be satisfied. For example, all data corresponding to a user experience in a session are sent. In an example, these data can include indications of a user: (1) hovering over a recommendation section to activate a pop-up window showing product reviews; (2) selecting items from a list identified on the page as those "users also viewed"; (3) adding a number of articles to a shopping cart; (4) applying a promotional gift card to a balance due in the shopping cart; and (5) not checking out of the shopping cart page. Because a universal tag sends the above example data, along with other data characterizing the user experience, an administrator or marketing professional is able to fully characterize any combination of user actions on a webpage. Regardless of which of the specified actions are performed, the data is sent upon loading, rendering, re-loading, or otherwise updating a webpage.

Universal tags are also shared, in some embodiments, between advertisers. That is, a universal tag reports data associated with a user interaction with an element to a common entity (or alternatively to all entities using the same universal tag) even when the universal tag is used in multiple distinct domains. This facilitates a comprehensive view of user behavior and a comprehensive view of interest in a product across domains. In some embodiments, an analysis engine enables attribution for a purchase to be assigned to one advertiser even though multiple advertisers use the universal tag. The term "webpage" is used for convenience of explanation to generically refer to any presentation of product data to a user via an electronic display device and/or system even though other mechanisms for communicating data are equally applicable to the present disclosure (e.g., a mobile application).

System Architecture

In some examples, embodiments of the present disclosure are operated within or in cooperation with a social networking system, although use of a social networking system as described below is presented merely for convenience of explanation. Other examples and embodiments are equally applicable to systems for applying universal tags to webpage elements, receiving data from user interactions with universal tags, and analyzing the received data.

Figure 1:
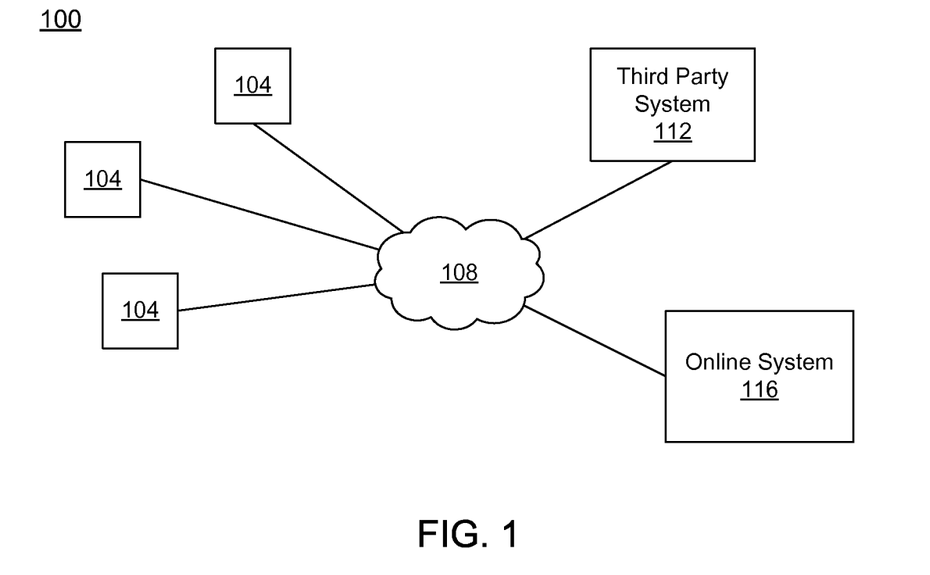
FIG. 1 is a block diagram of a system environment in which an online system operates, in an embodiment.

FIG. 1 is a high level block diagram of a system environment 100 for an online system 116. The online system can be any type of online system, such as an advertising system or a social networking system. For the purposes of this description, a social networking system is often used as an example, though this is not intended to be limiting in any way. The system environment 100 shown in FIG. 1 comprises one or more client devices 104, a network 108, one or more third-party systems 112, and the online system 116. In alternative configurations, different and/or additional components may be included in the system environment 100.

The client devices 104 are one or more computing devices capable of receiving user input as well as transmitting and/or receiving data via the network 108. In one embodiment, a client device 104 is a conventional computer system, such as a desktop or laptop computer. Alternatively, a client device 104 may be a device having computer functionality, such as a personal digital assistant (PDA), a mobile telephone, a smartphone or another suitable device. A client device 104 is configured to communicate via the network 108. In one embodiment, a client device 104 executes an application allowing a user of the client device 104 to interact with the online system 116. For example, a client device 104 executes a browser application to enable interaction between the client device 104 and the online system 116 via the network 108. In another embodiment, a client device 104 interacts with the online system 116 through an application programming interface (API) running on a native operating system of the client device 104, such as IOS® or ANDROID™.

In some embodiments, each of the client devices 104 is associated with the same user. This situation complicates identification of user interactions on webpages (or other internet resources, such as mobile applications) as the same user may perform different tasks on different client devices 104. Absent techniques to identify a user identity common to different devices, a comprehensive understanding of user behavior will be incomplete.

The client devices 104 are configured to communicate via the network 108, which may comprise any combination of local area and/or wide area networks, using both wired and/or wireless communication systems. In one embodiment, the network 108 uses standard communications technologies and/or protocols. For example, the network 108 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 108 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 112 may be coupled to the network 108 for communicating with the online system 116. In one embodiment, a third party system 112 is an application provider communicating information describing applications for execution by a client device 104 or communicating data to client devices 104 for use by an application executing on the client device. In other embodiments, a third party system 112 provides content or other information for presentation via a client device 104. Specific examples of a third party system 112 applicable to embodiments of the present disclosure include an advertising server or a server for providing product data to users (e.g., operating a website showing product data, operating an e-commerce website, providing content to mobile applications). The third party website 112 may also communicate information to the online system 116, such as advertisements, content, information about an application provided by the third party website 112, or information describing user-specific interactions with webpage elements.

Figure 2:
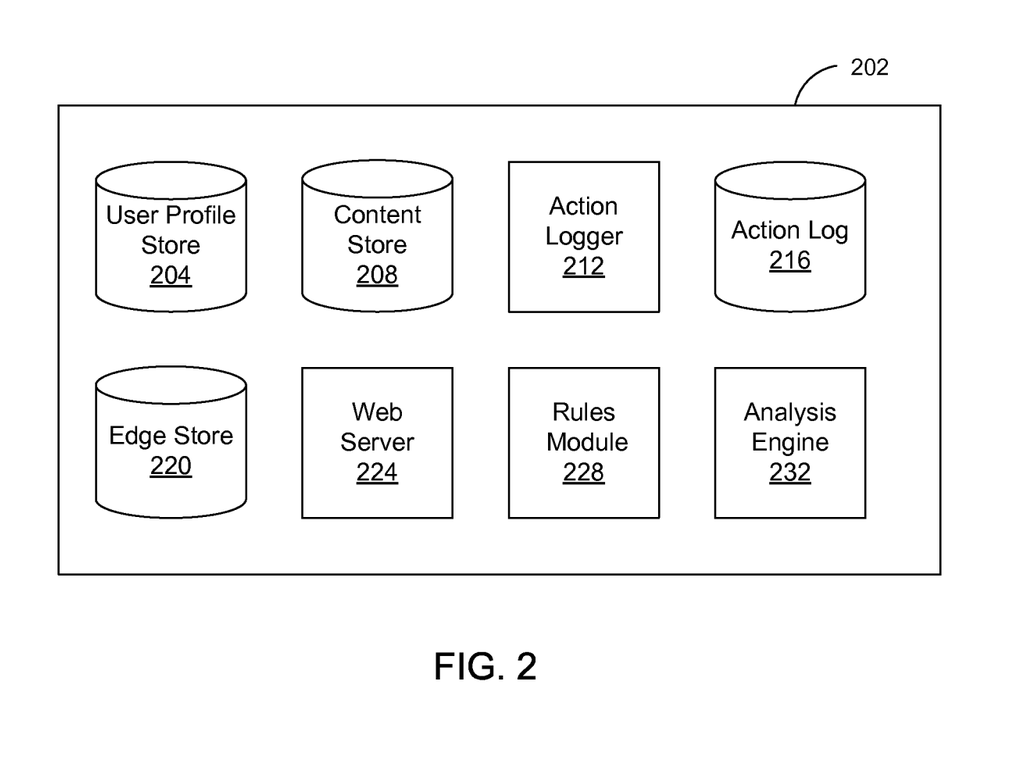
FIG. 2 is a block diagram of an online system, in an embodiment.

FIG. 2 is an example block diagram of an architecture of an online system 116. In some examples, the online system 116 is an online advertising system. In other examples, as explained above, a social networking system is used as an example and is illustrated in FIG. 2. If the online system 116 is an advertising system, then certain of the social networking components, such as an edge store 220, and the components may be not included or otherwise modified to fit that system. The social networking system 202 shown in FIG. 2, as an embodiment of the online system 116, includes a user profile store 204, a content store 208, an action logger 212, an action log 216, an edge store 220, a web server 224, a rules module 228, and an analysis engine 232. In other embodiments, the social networking system 202 may include additional, fewer, or different components for various applications. Conventional components such as network interfaces, security functions, load balancers, failover servers, management and network operations consoles, and the like are not shown so as to not obscure the details of the system architecture.

Each user of the social networking system 202 is associated with a user profile, which is stored in the user profile store 204. A user profile includes declarative information about the user that was explicitly shared by the user and may also include profile information inferred by the social networking system 202. In one embodiment, a user profile includes multiple data fields, each describing one or more attributes of the corresponding user of the social networking system 202. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 202 displayed in an image. A user profile in the user profile store 204 may also maintain references to actions by the corresponding user performed on content items in the content store 208 and stored in the action log 216.

The user profile store 204 is, in some embodiments, used to store the preferences and interests inferred from analysis of user interactions with the universal tags. While the universal tag interaction data is stored in other components of the social networking system (as described below with respect to action log 216), these user profile data are useful for analyzing and identifying specific user interests. For example, if a user interacts with price elements associated with universal tags, a user preference for price sensitivity may be stored in the user profile store 204. In another example, if a user interacts with a specific and identifiable subset of products associated with a specific brand (i.e., NIKE® running shoes), a user preference for the brand and the identified subset of products is stored in the user profile store 204. In these examples and others, the identified user preference is used to target advertising to the user consistent with the interests inferred from user interactions with universal tags.

While user profiles in the user profile store 204 are frequently associated with individuals, allowing individuals to interact with each other via the social networking system 202, user profiles may also be stored for entities such as businesses or organizations. This allows an entity to establish a presence on the social networking system 202 for connecting and exchanging content with other social networking system users. The entity may post information about itself, about its products, or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity. In some embodiments, universal tags are associated with elements of brand pages in the social networking system, and are used to identify user interests and, optionally, to target content (including advertising) to users.

The content store 208 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 208, such as status updates, photos tagged by users to be associated with other objects in the social networking system, events, groups or applications.

In some embodiments, objects are received from third-party applications or third-party applications separate from the social networking system 202. In one embodiment, objects in the content store 208 represent single pieces of content, or content "items." Hence, users of the social networking system 202 are encouraged to communicate with each other by posting text and content items of various types of media through various communication channels. This increases the amount of interaction of users with each other and increases the frequency with which users interact within the social networking system 202.

In other embodiments, objects include pages describing products and services associated with a brand in which each page includes various elements. These elements describe features associated with a particular product or service, such as price, color, size, reviews, user comments, or various product features. Webpages provided by a social networking system are analogous to those provided by third party systems, whether through a mobile application or an e-commerce website, and include universal tags associated with some or all of the page elements.

The action logger 212 receives communications about user actions internal to and/or external to the social networking system 202, populating the action log 216 with information about user actions. Examples of actions include interacting with a universal tag associated with an element of a webpage, adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 216.

The action log 216 may be used by the social networking system 202 to track user actions on the social networking system 202, as well as actions on third party systems 112 that communicate information to the social networking system 202. Users may interact with various objects on the social networking system 202, and information describing these interactions are stored in the action log 208. Examples of interactions with objects include: commenting on posts, sharing links, and checking-in to physical locations via a mobile device, accessing content items, and any other interactions. Additional examples of interactions with objects on the social networking system 202 that are included in the action log 216 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 216 may record a user's interactions with advertisements on the social networking system 202 as well as with other applications operating on the social networking system 202. In some embodiments, data from the action log 216 is used to infer interests or preferences of a user, augmenting the interests included in the user's user profile and allowing a more complete understanding of user preferences.

Additionally, the action log 216 (whether associated with the social networking system 202 or instantiated in a separate system) tracks user interactions with webpage elements that are associated with universal tags. That is, upon a user interacting with page containing a universal tag, the user experience data caused to be sent by the interaction is ultimately stored in the action log 216. This information identifies, for example, the elements, actions, and corresponding webpages that the user interacted with and the client device 104 by which the user executed the interaction. In one example, the client device is identified by use of a cookie corresponding to the user that is stored on the client device and usable by the user profile store 204 to identify the user. Because users can use more than one client device 104 to interact with webpages and because cookies are restricted on mobile devices, it is helpful to have access to information about the identity of the user, himself, rather than just information about his device acquired via a cookie. In some embodiments, the system described here has access to the user's actual identity that allows the user to be associated with his user profile that is stored in the user profile store 204. This allows the user not only to be identified, but can provide access to additional information about the user that may be in his profile, such as likes and dislikes, hobbies, social networking connections, etc., thus providing a much richer data set than can be acquired via a cookie and making cross-device tracking of a user much easier. For example, if a user is served an advertisement on a mobile device and then later makes a purchase of an advertised product on his desk top device, that conversion can be tracked and linked to that advertising impression since the user's identity is known.

Where the online system 116 is the social networking system 202, the identity of the users is known if the user is logged into the social networking system 202. The social networking system 202 thus links actions taken by the user during Internet navigation to the particular user, not just his device, and his corresponding social networking user profile. In other embodiments, the system 116 may not have direct access to the user identity, but may acquire it by partnering or otherwise sharing information with a system that tracks identity, such as a social networking system operating as a different domain. In one example, the online system 116 uses cookies to track its users, but applies a method by which the cookie is correlated with a user identifier used by another system, such as a social networking system, such that the identity of the user, and not just the device being used, is determined. An example of this type of correlation is further explained in U.S. application Ser. No. 14/641,256, filed on Mar. 6, 2015, which is hereby incorporated by reference herein in its entirety. This correlation allows a system that uses cookies to have access to a way to also determine the user's actual identity, which can then be used for better analysis of information gathered with universal tags.

Similarly, the action log 216 may store user actions taken on a third party system 112, such as an external website, that are communicated to the social networking system 202. For example, an e-commerce website that primarily sells sporting equipment at bargain prices may recognize a user of a social networking system 202 through a social plug-in enabling the e-commerce website to identify the user of the social networking system 202. Because users of the social networking system 202 are uniquely identifiable, e-commerce websites may communicate information about a user's actions outside of the social networking system to the social networking system 202 for association with the user. Hence, the action log 216 may record information about actions users perform on a third party system 112, including webpage viewing histories, advertisements that were engaged, purchases made, and other patterns from shopping and buying.

In one embodiment, an edge store 220 stores information describing connections between users and other objects on the social networking system 202 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 202, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 202, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 220 also stores information about edges, such as affinity scores for objects, interests, and other users. Affinity scores, or "affinities," may be computed by the social networking system 202 over time to approximate a user's affinity for an object, interest, and other users in the social networking system 202 based on the actions performed by the user. A user's affinity may be computed by the social networking system 202 over time to approximate a user's affinity for an object, interest, and other users in the social networking system 202 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 220, in one embodiment. Alternatively, each interaction between a user and a specific object is stored as a separate edge. In some embodiments, connections between users may be stored in the user profile store 204, or the user profile store 204 may access the edge store 220 to determine connections between users.

The web server 224 links the social networking system 202 via the network 108 to the one or more client devices 104, as well as to the one or more third party systems 112. The web server 202 serves web pages, as well as other web-related content, such as JAVA®, FLASH®, XML and so forth. The web server 224 may receive and route messages between the social networking system 202 and the client device 104, for example, instant messages, queued messages (e.g., email), text messages, short message service (SMS) messages, or messages sent using any other suitable messaging technique. A user may send a request to the web server 224 to upload information (e.g., images or videos) that are stored in the content store 208. Additionally, the web server 224 may provide application programming interface (API) functionality to send data directly to native client device operating systems, such as IOS®, ANDROID™, WEBOS® or RIM®. Furthermore, the web server 224 can be used to receive data transmitted by activation of tag upon a user interacting with a webpage. This data is then able to be analyzed using the analysis engine 232, as described below in more detail.

The rules module 228 enables entities, brand owners, advertisers, sellers, or analysts to generate server-side rules that process or filter the broad range of user experience data that can be transmitted by a universal tag to better understand the nature of a user's interaction with a webpage. The rules module 228 also provides a convenient graphical user interface that can be used with a webpage, as presented to a user, to select certain portions of a web page about which data should be collected when users interact with those portions. The rules module 228 allows parties to set tag-side rules on a webpage that prescribe page elements and corresponding user interactions that, upon a page reloading or rendering, will be sent (or reported) to the server. As explained above, the corresponding rules set on the server-side (set also through the rules module) will process that data sent when the tag fires. The server-side rules will count these specified user interactions on a webpage as "events" that are counted or otherwise recorded for the benefit of an analyst, administrator, marketing professional, or other recipient. The rules module 228 also stores the rules set by the user interface about what information to pass with the tag once defined for a page.

Figure 4:
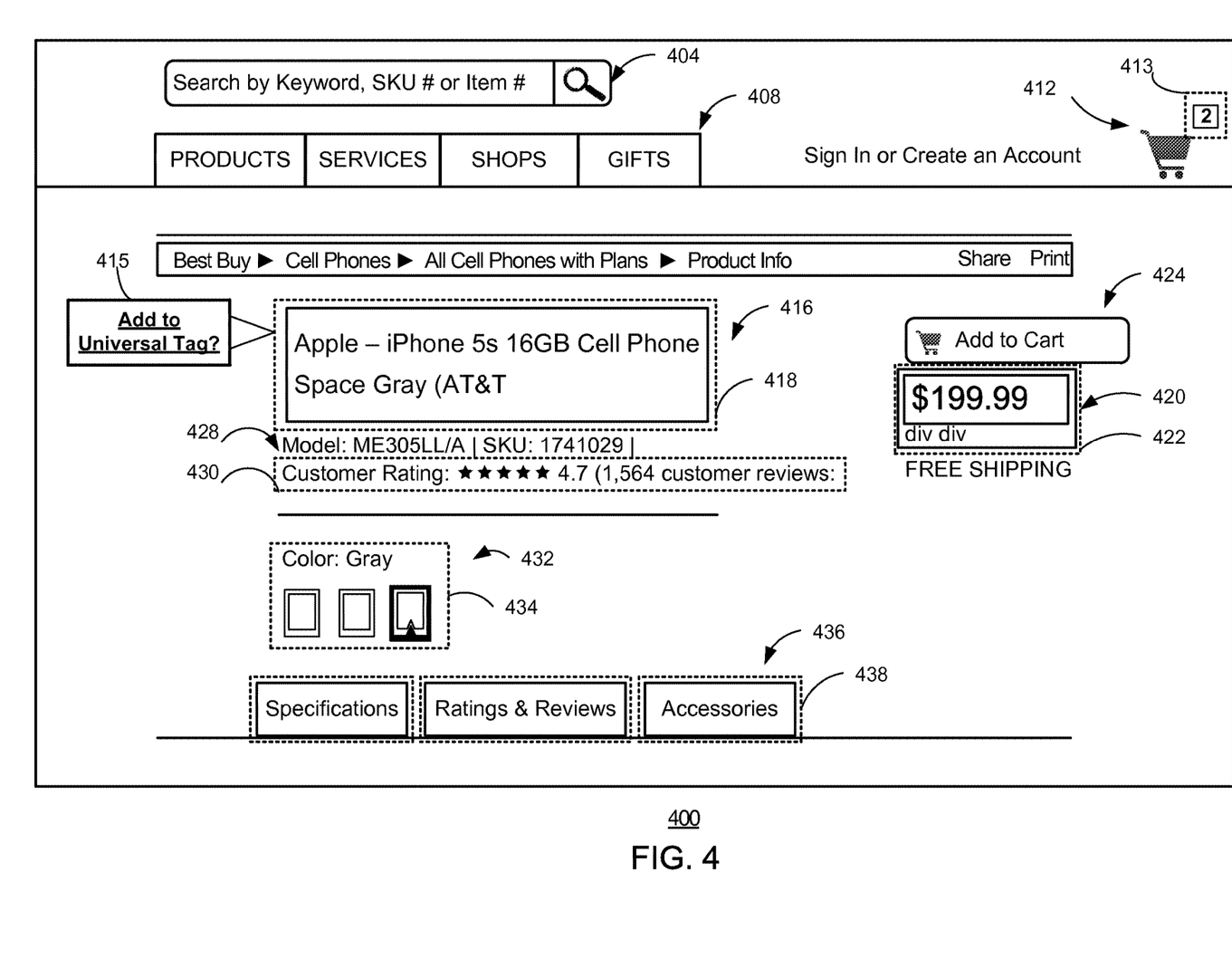
FIG. 4 is an illustration of a graphical user interface for associating universal tags with specific elements of a webpage, in an embodiment.

As described below in more detail in the context of FIG. 4, the rules module 228 enables, in one example, a marketing professional of a brand owner to graphically generate rules to specify what information to record and send as part of the operation of a universal tag. In this view, the webpage is highlighted, denoted, or otherwise marked to specify portions for which data will be sent. This is accomplished using only the graphical user interface. Upon highlighting, denoting, or otherwise marking the webpage element(s) of interest, the rules module 228 causes one or more tag-side rules corresponding to the selected elements of the webpage and/or specified user actions to be stored such that these can be applied to send certain information when the tag fires and such that there can be a subsequent analysis via server-side rules. As shown in FIG. 4, a box can be moved around on the page to highlight various fields on the page as fields for which data should be passed for the universal tag.

In some embodiments, it is also possible to define user interactions to be tracked by defining tag-side rules of a universal tag that are associated with a web page via the user interface of FIG. 4. Examples of user interactions with a page that might be specified for tracking include, but are not limited to, one or more of hovering over an element to activate a pop-up window (e.g., to see a user review or user comment), selecting an element, clicking on an element, and other definable user actions. These user interactions can then be analyzed on the server-side via rules also defined using the user interface of FIG. 4. In some examples, rules are defined as a set of actions that correspond to a set of webpage elements. In other examples, rules are defined as an order dependent series. That is, the universal tag causes user experience data to be sent responsive to a first user interaction occurring on a first user element, followed by a second user interaction occurring on a second webpage element. These can be constructed as a set of "if-then" instructions, such as "if a user hovers over a user recommendation on a first webpage, then hovers over a price on the first webpage, then navigates to a second webpage, then loads a product on the second webpage into a shopping cart, count this user experience as User Experience Type C."

The analysis engine 232 enables entities, brand owners, advertisers, sellers, or analysts to analyze interactions between users and specific webpage elements that have been indicated for the tag. This information is used to target different types of advertising or different content to the user. For example, the analysis engine 232 is used to analyze patterns of user behavior (across devices and/or display platforms) by examining the specific elements which a user has interacted across a variety of webpages, even those operated by different entities. As described above, analyzing patterns of user behavior with specific webpage elements is useful for identifying or inferring user preferences.

The analysis engine 232 also enables a universal tag shared between different advertisers to be analyzed across domains. Thus, not only does a universal tag capture a comprehensive view of user behavior that is independent of device, a universal tag captures user behavior common to a particular product even if the product is sold, offered for sale, or promoted by different entities. For example, NIKE® shoes may be sold on a NIKE® website, a third party internet-only retailer, and several third party retailers with both internet and physical retail locations. Using universal tags, an entity (e.g., NIKE® itself, a social networking system, etc.) receives information regarding the behavior of a particular user's interactions with webpage elements associated with universal tags across the distinct domains of the various retailers. A benefit of this is that the user behavior history (i.e., the webpages and elements across domains that the user interacted with prior to purchasing a product) is analyzed upon a purchase (or "conversion") by the user to determine which content items (e.g., advertisements, user reviews, price, promotions, retail domain) were most effective in convincing the user to purchase the product. The sale of the product is thus attributed to the most effective advertiser because the universal tags report information from multiple domains to at least one common recipient.

Analyzing these patterns is also useful for determining where in the "Marketing Funnel" a user may be. In one embodiment, if a user visits different websites for similar products and hovers over tagged "User Comments" sections in each website, it may be inferred that the user is researching competing products prior to having decided whether or not to even make a purchase. Accordingly, content describing various products and their relative benefits can be directed to a user to facilitate the user's research. Subsequently identified user interactions in which the user hovers over a price and various product options (e.g., color, size, availability, shipping price, delivery options) may indicate that the user has decided to purchase one of the competing products and is in the process of finalizing his decision. Again, content appropriate to the stage is directed to the user. In these examples, understanding of user behavior based on user interactions with specific webpage elements is used to direct information most relevant to the user's inferred interests, and most appropriate to the point of the decision process in which the user finds himself.

The analysis engine 232 may also be used to analyze information on an audience-scale rather than on an individual user basis. That is, having collected interaction data from many users regarding interactions with website elements corresponding to a particular product or product type, website, or advertiser, the collected interaction data is analyzed to determine patterns of behavior that may influence the presentation of advertising, the website, or product information.

The analysis engine 232 also enables credit for a "conversion" (i.e., an actual sale of a product) to be attributed to an appropriate entity even for cases, such as the one described above, in which multiple advertisers are promoting the same product. The analysis engine enables attribution models to be executed in real-time on a set of collected data. This is unlike conventional systems, in which attribution models are configured prior to data collection and cannot be modified in real-time to select various subsets of advertisers. An example of a multi-touch attribution model is further explained in U.S. application Ser. No. 14/644,200, filed on Mar. 10, 2015, which is incorporated by reference herein in its entirety.

Using Universal Tags

Figure 3:
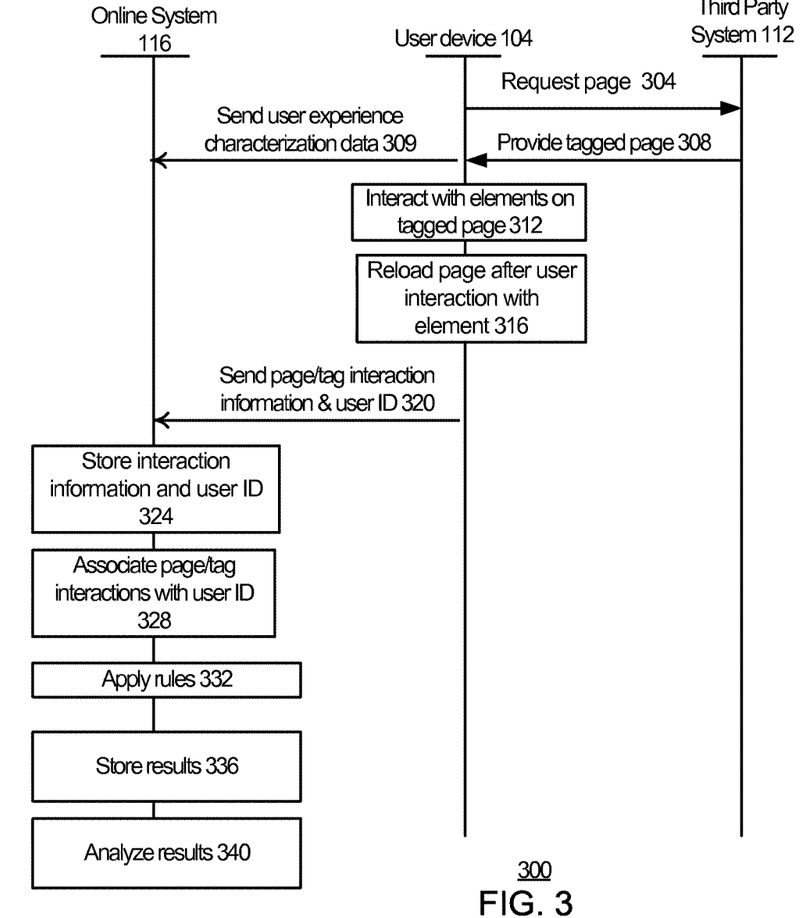
FIG. 3 is an interaction diagram illustrating a method for adding universal tags to elements of a webpage, receiving user interactions with the universal tags, and associating data describing the user interactions associated with a user account, in an embodiment.

FIG. 3 is an interaction diagram illustrating a method 300 for using universal tags to characterize a user experience of a webpage, in an embodiment.

A user device 104 requests 304 a webpage from the third party system 112. The webpage includes a universal tag that prescribes webpage elements and user actions to be stored and sent to the online system 116 upon rendering the webpage. The webpage is provided 308 to the user device 104. When the webpage is rendered, the tag is activated and causes user experience characterization data to be sent to the online system. For example, data sent to the system can include data about various fields on the page that was loaded, about how many items are currently in the user's shopping cart, about what the user clicked to be led to the webpage, etc. In some embodiments, the data sent when the tag fires is data about particular fields on the page that were associated in advance with the tag via the user interface of FIG. 4 described below.

In some embodiments, user interaction data can also be sent with the universal tag. In these embodiments, the user device 104 causes interactions 312 with elements of the webpage as the user is on the page. For example, the user might select certain items on the page, hover over certain portions of the page, etc. This user interaction data can also be sent to the online system 116. In one embodiment, the page is reloaded 316 such that the tag is activated to send this user interaction data.

The data sent to the online system 116 based on the tag can include an identifier of the device and/or the user that is caused to be sent to the online system 116 by the universal tag "firing" (i.e., being activated by the loading of the page). In one example, the data is sent by a redirect of the user device 104 to the online system 116. As described above, the data that is sent is the data prescribed by the universal tag that describes the user experience, and not merely an indication that a single action was performed as defined by rules included in the tag. In some examples, this transmission of data is a "re-direction" of the browser used to interact with the webpage. In some embodiments, the online system 116 stores 324 the data sent upon activation of the action tag and associates 328 the data with an identity of the device and, in some examples, the user himself (as described above). The online system 116 module applies 332 the server-side rules so that data of interest is identified from the broad set of user experience data that can be provided by activation of the universal tag. This determines which of the sent data is stored or used for analysis. After application 332 of the rules, the result of the application of the rules (also described as "filtering") are stored 336. The stored 336 results can be further analyzed 340, and used to produce reports according to the interests of the ultimate recipient of the filtered data.

Tagging Module User Interface

FIG. 4 illustrates a user interface 400 for applying tags graphically to an e-commerce webpage, in one embodiment. The user interface is one example of a display associated with the tagging module 228, described above.

The display 400 includes elements common to e-commerce websites including, but not limited to, a search bar 404, website navigation tabs 408, a shopping cart 412, a product description field 416, a product price 420, an "add to cart" button 424, a customer rating field and link 428, a color selection button 432, and product detail navigation tabs 436.

The display 400 is essentially the same as the display provided to users seeking to purchase products from the website. However, when accessed through or otherwise provided by the rules module 228, tag-side rules are graphically associated with one or more elements of the webpage that define what information to pass to the server for the tag. The one or more elements for which information will be passed as selected by highlighting an element with, in this example, a dashed box. In some embodiments, the user interface allows the box to be moved around the page to highlight different elements on the page. The user interface can be defined so that any element on a page can be highlighted to provide the maximum flexibility to the individual selected the page elements of interest.

When the user highlights an element on the page, a user interface can be provided to the user to allow the user to add that element to the universal tag or otherwise associate it with the tag such that information about that element will be passed to the advertising system for the tag. User interface box 415 provides one example. When the user selects the product description field 416 by highlighting 418 it as shown by the dashed line around the field 416, the user interface box 415 pops up to ask the user whether to add the field to the universal tag. If the user selects the box or takes some other action (e.g., clicks a "yes" button that is offered, etc.), the field 416 will be associated with the tag. The user can continue to do this for multiple fields on the page, and each time a user interface element, such as 415, can be provided to the user to confirm to add the field to the universal tag. In some embodiments, different user interface elements provide the user with various options (e.g., add this field in its entirety or certain elements within the field—the user could add just "Space Gray" rather than the entire product description), provide suggestions to the user (e.g., you added the product description field, do you also want to add the product color field?), provide information to the user (e.g., most users add this field along with this other field), etc. In some cases, the user interface element 415 might have a comments field or area where the user can insert text to define the field being highlighted. For example, the user interface could allow us to associate "add to package" button with the universal tag (e.g., specify that this button corresponds to an action of adding to the cart, etc.). Similarly, the user interface could allow the user to associate the color selection with the universal tag (e.g., specify that selecting the "gray" color button corresponds to an action of selecting a color with a property of "gray, selecting the "silver" color button corresponds to an action of selecting a color with a property of "silver," etc.).

As shown in the display 400, the shopping cart icon is selected by highlighting 413; the product description field 416 is selected by highlighting 418; the product price 420 is highlighted by highlighting 422; customer rating field and link 428 are highlighted by highlighting 430; the color selection button 432 is highlighted by highlighting 434; and the product detail navigation tabs 436 are highlighted by highlighting 438. These highlighted elements are provided only for illustration and for the convenient use of the rules module 228, but do not actually appear in the page presented to the viewing user. Any of the elements shown in the display 400, as any elements in any equivalent webpage, can be highlighted to select the elements of the about for which information will be passed. This conveniently allows a less technical team member to select elements of a page that may be of interest. For example, the marketing team may be more familiar than the technical team with what portions of the page are interesting for tracking purposes. However, this marketing team member may be less equipped than the technical team member to design a tag that has the appropriate code to set what information to pass. This system allows the marketing team member to simply move around a box to select the key elements of the page, and the code for passing these parameters is automatically defined by the system upon selection of the element.

As one example, a marketing team member might select the item description (Apple-iPhone 5s 16 GB Cell Phone Space Gray) and the shopping cart icon as two fields of interest to be associated with a universal tag on the page. When a user later navigates to this same page and page loads, the tag will fire and will pass the item description and shopping cart information to the server. The server might have rules that specify to track any time the user loads a page that has a Space Gray iPhone and also has at least one item in his shopping cart. If the user has any items in the shopping cart, a number appears next to the cart, so in this case the user has two items, and an event would be counted.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
sending, by an online system, a user interface including a display of a webpage of a third-party system comprising a plurality of webpage elements and a first user interface control allowing a first user to graphically highlight a subset of webpage elements of the plurality of webpage elements;
receiving, via the user interface, a graphical highlight of the subset of webpage elements applied by the first user;
providing, via the user interface, a second user interface control allowing the first user to create a plurality of tags on the webpage, each tag associated with at least one webpage element of the subset of webpage elements, and each tag defining a tag-side rule causing data describing user interactions with the at least one webpage element to be sent to the online system upon activation of the tag;
storing data associating the subset of webpage elements with the plurality of tags received via the user interface;
sending, by the third-party system, the webpage to a device of a second user, wherein the second user is a user of the online system, the webpage comprising the subset of webpage elements associated with the plurality of tags, wherein the webpage is configured to send data describing user interactions with the subset of webpage elements to the online system;
responsive to activation of one of the plurality of tags at the device of the second user, receiving at the online system data describing user interactions of the second user with the at least one webpage element associated with the tag based on the corresponding tag-side rule, the data including a device identifier;
determining a user identifier corresponding to the received device identifier, the determining comprising comparing the device identifier with information stored in a plurality of user profiles, wherein at least a user profile in the plurality of user profiles is associated with a plurality of device identifiers, and wherein determining the user identifier corresponding to the received device identifier further comprises matching the received device identifier with a user identifier associated with the second user based on the received device identifier;
applying at least one server-side rule at the online system to analyze the data received at the system describing user interactions of the second user with the at least one webpage element; and
storing a result of the analysis in a user profile associated with the second user.

2. The method of claim 1, wherein the at least one webpage element comprises at least one of a product feature, a product name, and a product price displayed on the webpage.

3. The method of claim 1, wherein the user interactions with the at least one webpage element associated with the activated tag comprise a series of user interactions with at least three webpage elements.

4. The method of claim 1, wherein the user interactions with the at least one webpage element associated with the activated tag comprise at least two of a hover, a click, and a selection of the at least one webpage element.

5. The method of claim 1, wherein the data describing user interactions comprises a device identifier, a webpage identifier, at least two webpage element identifiers, and at least two interactions performed on the least two identified webpage elements.

6. The method of claim 1, wherein determining a user identifier corresponding to the received device identifier further comprises:
matching the received device identifier with a user identifier associated with the second user based on the received device identifier.

7. The method of claim 1, further comprising analyzing attribution data associated with a product using the data describing interactions, wherein the activated tag is associated with two or more advertisers.

8. A system comprising:
a processor; and
a non-transitory computer-readable memory comprising instructions that when executed by the processor cause the processor to:
send a user interface including a display of a webpage of a third-party system comprising a plurality of webpage elements and a first user interface control allowing a first user to graphically highlight a subset of webpage elements of the plurality of webpage elements;
receive, via the user interface, a graphical highlight of the subset of webpage elements applied by the first user;
provide, via the user interface, a second user interface control allowing the first user to create a plurality of tags on the webpage, each tag associated with at least one webpage element of the subset of webpage elements, and each tag defining a tag-side rule causing data describing user interactions with the at least one webpage element to be sent to the system upon activation of the tag;
store data associating the subset of webpage elements with the plurality of tags received via the user interface;
send, by the third-party system, the webpage to a device of a second user, wherein the second user is a user of an online system, the webpage comprising the subset of webpage elements associated with the plurality of tags, wherein the webpage is configured to send data describing user interactions with the subset of webpage elements to the system;

receive, responsive to activation of one of the plurality of tags at the device of the second user, data describing user interactions of the second user with the at least one webpage element associated with the tag based on the corresponding tag-side rule, the data including a device identifier;

determine a user identifier corresponding to the received device identifier, the determining comprising comparing the device identifier with information stored in a plurality of user profiles, wherein at least a user profile in the plurality of user profiles is associated with a plurality of device identifiers, and wherein determining the user identifier corresponding to the received device identifier further comprises matching the received device identifier with a user identifier associated with the second user based on the received device identifier;

apply at least one server-side rule at the system to analyze the data received at the online system describing user interactions with the at least one webpage element; and store a result of the analysis in a user profile associated with the second user.

9. The system of claim 8, wherein the at least one webpage element comprises at least one of a product feature, a product name, and a product price displayed on the webpage.

10. The system of claim 8, wherein the user interactions with the at least one webpage element associated with the activated tag comprise a series of user interactions with at least three webpage elements.

11. The system of claim 8, wherein the instructions further cause the processor to analyze attribution data associated with a product using the data describing interactions, wherein the activated tag is associated with two or more advertisers.

12. The system of claim 8, wherein the user interactions with the at least one webpage element associated with the activated tag comprise at least two of a hover, a click, and a selection of the at least one webpage element.

13. The system of claim 8, wherein the data describing user interactions comprises a device identifier, a webpage identifier, at least two webpage element identifiers, and at least two interactions performed on the least two identified webpage elements.

14. The system of claim 13, wherein determining a user identifier corresponding to the received device identifier further comprises:

matching the received device identifier with a user identifier associated with the second user based on the received device identifier.

15. A non-transitory computer-readable storage medium containing computer program code that, when executed by a processor, causes the processor to perform steps comprising:

sending, by an online system, a user interface including a display of a webpage of a third-party system comprising a plurality of webpage elements and a first user interface control allowing a first user to graphically highlight a subset of webpage elements of the plurality of webpage elements;

receiving, via the user interface, a graphical highlight of the subset of webpage elements applied by the first user;

providing, via the user interface, a second user interface control allowing the first user to create a plurality of tags on the webpage, each tag associated with at least one webpage element of the subset of webpage elements, and each tag defining a tag-side rule causing data describing user interactions with the at least one webpage element to be sent to the online system upon activation of the tag;

storing data associating the subset of webpage elements with the plurality of tags received via the user interface;

sending, by the third-party system, the webpage to a device of a second user, wherein the second user is a user of the online system, the webpage comprising the subset of webpage elements associated with the plurality of tags, wherein the webpage is configured to send data describing user interactions with the subset of webpage elements to the online system;

responsive to activation of one of the plurality of tags at the device of the second user, receiving at the online system data describing user interactions of the second user with the at least one webpage element associated with the tag based on the corresponding tag-side rule, the data including a device identifier;

determining a user identifier corresponding to the received device identifier, the determining comprising comparing the device identifier with information stored in a plurality of user profiles, wherein at least a user profile in the plurality of user profiles is associated with a plurality of device identifiers, and wherein determining the user identifier corresponding to the received device identifier further comprises matching the received device identifier with a user identifier associated with the second user based on the received device identifier;

applying at least one server-side rule at the online system to analyze the data received at the online system describing user interactions of the second user with the at least one webpage element; and storing a result of the analysis in a user profile associated with the second user.

16. The non-transient computer-readable storage medium of claim 15, wherein the at least one webpage element comprises at least one of a product feature, a product name, and a product price displayed on the webpage.

17. The non-transient computer-readable storage medium of claim 15, wherein the at least one server-side rule comprises a series of user interactions with at least three webpage elements.

18. The non-transient computer-readable storage medium of claim 15, wherein the user interactions with the at least one webpage element associated with the activated tag comprise at least two of a hover, a click, and a selection of the at least one webpage element.

19. The non-transient computer-readable storage medium of claim 15, wherein the data describing user interactions comprises a device identifier, a webpage identifier, at least two webpage element identifiers, and at least two interactions performed on the least two identified webpage elements.

20. The non-transient computer-readable storage medium of claim 19, wherein determining a user identifier corresponding to the received device identifier further comprises:

matching the received device identifier with a user identifier associated with the second user based on the received device identifier.

\* \* \* \* \*